2,874,038
Patented Feb. 17, 1959

2,874,038

METHOD OF TREATING MOLTEN METALS

Adalbert Rühenbeck, Schwelm, Wilhelm Mattheis, Mannheim, and Josef Zirn, Dusseldorf, Germany No Drawing. Application August 8, 1956
Serial No. 602,907

Claims priority, application Germany September 19, 1955

11 Claims. (Cl. 75—59)

The present invention relates to a method of treating molten metals and metal alloys during the casting thereof, and more particularly to a gas treatment of iron and iron alloys for the removal of impurities therefrom.

Prior to the present invention, it has been the practice in the production of cast iron during the casting of iron or in the production of cast iron or the steel alloys to avoid any hydrogen from contacting the molten metal. Although molten iron and iron alloys contain impurities from oxide slags which it is desirable to reduce, hydrogen was never used for this purpose prior to the present invention because of the supposedly deleterious effect of hydrogen on the iron and iron alloys.

It is a primary object of the present invention to provide a method of reducing oxide impurities in molten iron and iron alloys, including steels, and other molten metals containing oxide slag impurities, by treatment of the molten metal with hydrogen, whereby the impurities are reduced without deleteriously affecting the casting.

It is another object of the present invention to provide a method of reducing oxide slag impurities in molten metals during the casting thereof by treatment with hydrogen whereby an excess of hydrogen is avoided.

It is still another object of the present invention to provide a method of reducing oxide slag impurities in molten metals by treatment with hydrogen either in gaseous form or in solid form.

Other objects and advantages of the present invention will be apparent from a further reading of the specification and of the appended claims.

With the above objects in view, the present invention mainly consists in a method of producing castings free of oxide impurities, comprising the steps of treating a molten metal containing oxide impurities with hydrogen in an amount just sufficient to react with all of the oxides in the molten metal to reduce the oxides, whereby the molten metal is substantially completely free of oxides and the hydrogen utilized is substantially completely consumed, and recovering the thus casted metal which is substantially free of oxides.

The present invention relates to the treatment of all molten metals which contain impurities from oxide slags which are capable of being reduced by hydrogen, and more particularly it relates to the treatment of castings made of iron and iron alloys (the term "iron alloys" including steels) which contain reducible impurities from oxide slags.

In accordance with the present invention such molten metals containing oxide impurities are treated with hydrogen which is introduced into the melt in regulated quantities in the form of hydrogen gas or gases or solid substances containing hydrogen. The introduced hydrogen is consumed as it reduces the oxide slags, and as a result the melt is freed of the oxide slag impurities. In this way, the invention utilizes hydrogen for the reduction of oxide slags in iron melts and melts of iron alloys, and by virtue of this deoxidation it achieves a refinement of the structure and renders it more compact. Reduction by hydrogen has the advantage of resulting in products which escape from the melt in gaseous form.

Any casting method may be used with the method of the present invention, as for example, centrifugal casting, continuous casting, or any other type. The hydrogen which is utilized to reduce the oxide impurities in the molten metal may be introduced into the melt in gaseous state, for example through a lance or nozzle which moves back and forth through the melt, or through graphite tubes. According to a preferred embodiment of the present invention the gaseous hydrogen is introduced into the melt through porous tubes or a porous unit which is most advantageously located at the bottom of the casting vessel. According to this embodiment, the gaseous hydrogen is introduced uniformly in finely distributed form throughout the entire melt.

As indicated above, it is preferred according to the present invention to utilize an amount of hydrogen which is just sufficient to reduce all of the oxide impurities in the melt, while avoiding any excess of hydrogen. This may be advantageously accomplished according to the present invention by accurately observing the temperature of the melt, for example by the use of pyrometers, or thermocouples. Upon introduction of the hydrogen into the melt the temperature rises by about 60–120° C. due to the chemical reactions between the introduced hydrogen and the oxide slag impurities. Thus, at the conclusion of the reaction, i. e. when no oxides are present to be reduced by the introduced hydrogen, any further introduction of hydrogen is accompanied by a decrease in temperature since chemical reactions of an exothermic nature are no longer taking place. This indicates when the introduction of hydrogen should be stopped so that the melt is not subjected to any excess of hydrogen, which is undesirable for many purposes, and particularly for certain types of molten metals.

If the hydrogen is introduced into the melt in gaseous form, it is preferable to utilize porous units through which the hydrogen is fed into the melt in the form of uniformly distributed tiny bubbles. This means ensures a uniform gas treatment, particularly by adapting the porous units to the bottom surface of the crucible or the like.

According to another embodiment of the present invention, the hydrogen can be introduced into the melt in solid form, e. g. in combination with a solid hydrogen carrier, or in the form of a chemical salt. In such case, it is also necessary to operate in such manner that an exact amount of hydrogen is utilized to react with all of the oxide impurities without providing an excess of hydrogen. This may be achieved, for example, by the use of a bubble bell which contains hydrogen in a solid combination and which is removed when the maximum temperature resulting from the treatment with hydrogen is attained. In such manner, it is easily possible to determine the quantity in such way that the hydrogen introduced into the melt is completely used up for the complete reduction of all of the oxide slag impurities.

According to the particular properties of the melt, when using hydrogen in solid form, it is also possible to carry out the dosing by the introduction of definite quantities of the hydrogen which are calculated according to the quantity and composition of the melt to be treated, which are determined experimentally for each individual case. It is particularly appropriate to introduce hydrogen quantitatively into the melt in the form of a hydride compound, for instance combined with elements belonging to the second group of the periodic table, e. g. calcium hydride, because the element such as calcium also has a beneficial reducing effect. Magnesium hydride can also be used with iron melts with particular advantage.

In view of the fact that the hydrides or other hydrogen compounds particularly of the elements belonging to the second group of the periodic table easily decompose, it is recommended according to the present invention that the hydrogen carriers be coated before they are introduced. A method which has proved very suitable is to coat the hydrogen compound in the form of powdered or granulated hydrides with paraffin coverings or similar protective coverings made of synthetic products containing hydrocarbons or hydrogen, and the material is then introduced into the melt in this form. The hydrides or other hydrogen carriers can also be encased in capsules of sheet iron or the like, inasmuch as these capsules disintegrate in the melt. However, it is also possible to bind the hydrogen by absorption in alloying elements such as palladium or lithium, and to introduce such combination into the melt in definite quantities.

It is also possible according to the present invention to introduce the hydrogen into the melt for the reduction of the oxide slag impurities therein by a combination of any of the above described methods for the introduction of the hydrogen into the melt.

The introduction of hydrogen into the melt and the consequent reduction of the oxide slag impurities therein in the manner described above, not only achieves a deoxidation of the oxide slag impurities, but also makes the structure of the casting more compact and refined and in addition improves the resistance to corrosion of the casting. For instance, for the production of chill castings, it is also possible, after carrying out the deoxidation process described above, to subject the melt to a further gas treatment using hydrogen or gases containing hydrogen, so that the maximum possible excess of the gas is dissolved in the melt. In this case, when the castings set, the hydrogen separates out in the form of small bubbles and micro-bubbles, which however do not coalesce. In this way the hydrogen exerts a pushing effect on the castings which have not yet completely hardened and are still fluid inside, and this not only prevents the formation of pipes, cavities or cracks, but because of the excess gas present presses the castings with their still deformable outer surfaces against the molds, e. g. ingot molds, and thus improves the surface and accuracy of the castings produced.

Even in the case of alloys which themselves are not suitable for chill casting, such as sand mold casting alloys, these can be used to produce perfect chill castings in a surprising manner when subjected to excess gas treatment. There is practically no disadvantage from a deterioration in the strength properties, which one could fear as a result of the porosity described, because the pores are extremely small. For the purpose of the excess gas treatment, it is particularly advantageous to use the largest possible porous units as described above, and in this way the gas treatment can be carried out immediately before casting or actually into the cast steel.

The size of the pores of the porous units is chosen in such a way, that the melt cannot penetrate into the pores of the porous units because of the surface tension. It is also possible to introduce the hydrogen in solid form when carrying out excess gas treatment, for example by the introduction of chemically combined hydrogen into the melt.

According to still another embodiment of the present invention, it is also possible to introduce the melt which has been treated with hydrogen in the manner described, preferably the melt which is charged with an excess of hydrogen, into molds to which water has been added to increase the moisture content to more than 5%, and even into wet molds. Surprisingly, when this is done, phenomena of an explosive character or of a similarly disturbing nature do not take place, and because of this it is possible to combine with the casting process a simultaneous quenching process and a hardening or surface hardening and tempering process. When doing so, it is possible to reduce the usual addition of bentonite in the molds.

The advantages achieved by the invention are many:

By means of the measured gas treatment with hydrogen, an optimum deoxidation is achieved, the melt is freed to the greatest possible extent of oxides, the hydrogen (unless it is desired to carry out an excess gas treatment) is completely consumed and the structure is refined. A great advantage is that the products of the deoxidation process are liberated in the form of gases or vapors and do not remain in the melt; surprisingly it has been found that the treatment of cast iron melts as proposed by the invention at the same time has a beneficial effect on the strength characteristics as a result of improvements in the structure; in this way it has been found that the strength of iron castings produced by means of the process according to the invention approaches the strength of steel castings; by strength characteristics, tensile strength, elongation and notch impact strength are to be understood.

In the case of the proposal to introduce the hydrogen into the melts in the form of a hydride of an element belonging to the second group of the periodic table, a particularly striking increase in the strength takes place. The introduction of measured quantities of hydrogen has a further advantageous effect in that castings produced by means of the process according to the invention set practically free from ferrite, that is to say, the combined carbon in the castings is increased up to the eutectic. The appreciably more homogeneous structure resulting from the absence of ferrites is expressed in its great resistance to corrosion.

If excess gas treatment is carried out and metal is cast into molds having an increased moisture content, as a result of the quenching effect produced in this way, a hardened or tempered structure with increased strength characteristics is obtained, at least in the surface zones, depending on the thickness of the casting. Consequently, subsequent treatment of the finished castings for the purpose of attaining such a structure is not necessary when proceeding according to the method of the present invention.

The following example of an H-casting is given as illustrative only of the present invention, the invention however not being limited to the special details of the example.

*Example*

For the production of H-casting are used:

25% haematite
12.5% furnace silicium, containing 10.5% Si
62% steel scrap
0.5% ferro-manganese, containing 75% Mn The melting reaction is obtained by putting a predetermined amount of hydrogen into the charge. The analysis of the ready H-casting is:

C _____ 3.10%.
Si _____ 1.90%.
Mn _____ 0.71%.
P _____ 0.05%.
S _____ 0.05%.
Strengths:
    Tensile strength _____ 34 kgs. per mm.$^2$.
    Bending strength _____ 62 kgs. per mm.$^2$.
    Brinell hardness _____ 220 per mm.$^2$.
    Bending _____ 15 mm.

The casting temperature is 1250°–1350° C. The casting times are normal. The casting takes place immediately after the melting reaction.

Without further analysis, the foregoing will so fully reveal the gist of the present invention that others can by applying current knowledge readily adapt it for various applications without omitting features that, from the standpoint of prior art, fairly constitute essential char-

We claim:

1. A method of treating molten metals, comprising the steps of introducing into a molten metal containing oxide slag impurities hydrogen which reacts with said oxide slag impurities to reduce the same, said reaction being exothermic and resulting in an increase in temperature of said molten metal; continuing said introduction of hydrogen into said molten metal until the temperature of the molten metal no longer increases, whereby the amount of hydrogen introduced is just sufficient to reduce all of said oxide slag impurities; and recovering a metal substantially free of oxide slag impurities.

2. A method of treating molten metals, comprising the steps of introducing into a molten metal containing oxide slag impurities gaseous hydrogen in the form of fine bubbles uniformly distributed through said molten metal, said hydrogen reacting with said oxide slag impurities to reduce the same, said reaction being exothermic and resulting in an increase in temperature of said molten metal; continuing said introduction of hydrogen into said molten metal until the temperature of the molten metal no longer increases, whereby the amount of hydrogen introduced is just sufficient to reduce all of said oxide slag impurities; and recovering a metal substantially free of oxide slag impurities.

3. A method of treating molten metals, comprising the steps of introducing into a molten metal containing oxide slag impurities gaseous hydrogen which reacts with said oxide slag impurities to reduce the same, said reaction being exothermic and resulting in an increase in temperature of said molten metal; continuing said introduction of gaseous hydrogen into said molten metal until the temperature of the molten metal no longer increases, whereby the amount of hydrogen introduced is just sufficient to reduce all of said oxide slag impurities; and recovering a metal substantially free of oxide slag impurities.

4. A method of treating molten metals, comprising the steps of introducing into a molten metal selected from the group consisting of iron and iron alloys containing oxide slag impurities hydrogen which reacts with said oxide slag impurities to reduce the same, said reaction being exothermic and resulting in an increase in temperature of said molten metal; continuing said introduction of hydrogen into said molten metal until the temperature of the molten metal no longer increases, whereby the amount of hydrogen introduced is just sufficient to reduce all of said oxide slag impurities; and recovering a metal substantially free of oxide slag impurities.

5. A method of treating molten metals, comprising the steps of introducing into a molten metal containing oxide slag impurities hydrogen absorbed by a solid carrier, said hydrogen reacting with said oxide slag impurities to reduce the same, said reaction being exothermic and resulting in an increase in temperature of said molten metal; continuing said introduction of hydrogen into said molten metal until the temperature of the molten metal no longer increases, whereby the amount of hydrogen introduced is just sufficient to reduce all of said oxide slag impurities; and recovering a metal substantially free of oxide slag impurities.

6. A method of treating molten metals, comprising the steps of introducing into a molten metal containing oxide slag impurities hydrogen in the form of a salt containing hydrogen, said hydrogen reacting with said oxide slag impurities to reduce the same, said reaction being exothermic and resulting in an increase in temperature of said molten metal; continuing said introduction of hydrogen into said molten metal until the temperature of the molten metal no longer increases, whereby the amount of hydrogen introduced is just sufficient to reduce all of said oxide slag impurities; and recovering a metal substantially free of oxide slag impurities.

7. A method of treating molten metals, comprising the steps of introducing into a molten metal containing oxide slag impurities hydrogen absorbed by a substance selected from the group consisting of palladium and lithium, said hydrogen reacting with said oxide slag impurities to reduce the same, said reaction being exothermic and resulting in an increase in temperature of said molten metal; continuing said introduction of hydrogen into said molten metal until the temperature of the molten metal no longer increases, whereby the amount of hydrogen introduced is just sufficient to reduce all of said oxide slag impurities; and recovering a metal substantially free of oxide slag impurities.

8. A method of treating molten metals, comprising the steps of introducing into a molten metal containing oxide slag impurities hydrogen in the form of a hydride of an element of the second group of the periodic table, said hydrogen reacting with said oxide slag impurities to reduce the same, said reaction being exothermic and resulting in an increase in temperature of said molten metal; continuing said introduction of hydrogen into said molten metal until the temperature of the molten metal no longer increases, whereby the amount of hydrogen introduced is just sufficient to reduce all of said oxide slag impurities; and recovering a metal substantially free of oxide slag impurities.

9. A process according to claim 1 in which said hydrogen is introduced in the form of hydride particles which are coated with hydrogen-containing protective coatings.

10. A process according to claim 9 in which said protective coating is made of paraffin.

11. A process according to claim 1 in which said hydrogen is introduced in the form of hydrides encased in sheet iron capsules.

References Cited in the file of this patent

UNITED STATES PATENTS

| | | |
|---|---|---|
| 482,001 | Brazelle | Sept. 6, 1892 |
| 1,792,967 | Clark | Feb. 17, 1931 |
| 2,604,393 | Smalley | July 22, 1952 |

FOREIGN PATENTS

| | | |
|---|---|---|
| 2,314 | Great Britain | 1879 |

OTHER REFERENCES

Wulff: Powder Metallurgy (page 123 relied on), published by The American Society for Metals, Cleveland Ohio (1942).